United States Patent
Bobbitt et al.

(10) Patent No.: US 8,494,214 B2
(45) Date of Patent: Jul. 23, 2013

(54) DYNAMICALLY LEARNING ATTRIBUTES OF A POINT OF SALE OPERATOR

(75) Inventors: Russell P. Bobbitt, Pleasantville, NY (US); Quanfu Fan, Somerville, MA (US); Arun Hampapur, Norwalk, CT (US); Frederik C. M. Kjeldsen, Poughkeepsie, NY (US); Sharathchandra U. Pankanti, Darien, CT (US); Akira Yanagawa, New York, NY (US); Yun Zhai, White Plains, NY (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 982 days.

(21) Appl. No.: 12/261,304

(22) Filed: Oct. 30, 2008

(65) Prior Publication Data
US 2010/0111404 A1 May 6, 2010

(51) Int. Cl.
*G06K 9/00* (2006.01)
(52) U.S. Cl.
USPC ......................................................... 382/103
(58) Field of Classification Search
None
See application file for complete search history.

(56) References Cited

U.S. PATENT DOCUMENTS

| | | | |
|---|---|---|---|
| 6,236,736 B1 * | 5/2001 | Crabtree et al. | 382/103 |
| 6,295,367 B1 | 9/2001 | Crabtree et al. | |
| 6,618,490 B1 | 9/2003 | Cham et al. | |
| 6,697,502 B2 | 2/2004 | Luo | |
| 6,952,496 B2 * | 10/2005 | Krumm | 382/170 |
| 7,047,494 B2 | 5/2006 | Wu et al. | |
| 7,305,128 B2 | 12/2007 | Lee et al. | |
| 2005/0244033 A1 | 11/2005 | Ekin et al. | |

OTHER PUBLICATIONS

Bibby, Charles. "Robust Real-Time Visual Tracking Using Pixel-Wise Posteriors", Computer Vision—ECCV 2008: 10th European Conference on Computer Vision, Marseille, France, Oct. 12-18, 2008. Proceedings. [Retrieved Online: Nov. 18, 2011].*

* cited by examiner

*Primary Examiner* — Claire X Wang
*Assistant Examiner* — Thomas A James
(74) *Attorney, Agent, or Firm* — Darrell L. Pogue; Keohane & D'Alessandro, PLLC (57) ABSTRACT

An approach that dynamically learns a set of attributes of an operator of a point of sale (POS) is provided. In one embodiment, there is an attribute tool, including an extraction component configured to receive sensor data of a set of moving objects, and extract a set of attributes from each of the set of moving objects captured within the scan area at the POS; an identification component configured to update an appearance model with the set of attributes from each of the set of moving objects; and an analysis component configured to analyze the appearance model to identify at least one of the set of moving objects as an operator of the POS.

16 Claims, 5 Drawing Sheets

DYNAMICALLY LEARNING ATTRIBUTES OF A POINT OF SALE OPERATOR

FIELD OF THE INVENTION

The present invention generally relates to point of sale (POS) operation. Specifically, the present invention provides a way to improve security at a POS for increased loss prevention.

BACKGROUND OF THE INVENTION

Shopping checkout (e.g., retail, supermarket, etc.) is a process by which most everyone is familiar. Typical checkout involves a shopper navigating about a store collecting items for purchase. Upon completion of gathering the desired items, the shopper proceeds to a point-of sale (POS) checkout station for checkout (e.g., bagging and payment). POS systems are used in supermarkets, restaurants, hotels, stadiums, casinos, as well as almost any type of retail establishment, and typically include three separate functions that today are mostly lumped together at a single POS station: (1) enumerating each item to be purchased, and determining its price (typically, by presenting it to a bar code scanner), (2) verifying that each item is what it was claimed to be, and (3) paying for the item(s).

Unfortunately, with increased volumes of shoppers and instances of operator collusion, theft is growing at an alarming rate. In an attempt to detect operator collusion, the bodily movements of cashiers are monitored and analyzed to determine whether the movements are typical. Atypical movements by a cashier may indicate that a security breach has occurred. In the process of detecting cashiers' behavior, visual attribute information from an image is used to detect the position of the hands and/or arms of the cashier. However, to make a model for cashiers' hands and arms using prior art approaches, it is necessary to manually input the skin/attire color of each cashier, or use a generic public database. In the case of the former, the work of inputting the skin color of each cashier is a burden. In the case of the latter it is difficult to get high performance using a public database due to the variation of skin color, attire color, and light conditions.

SUMMARY OF THE INVENTION

In one embodiment, there is a method for dynamically learning a set of attributes of an operator of a point of sale (POS). In this embodiment, the method comprises: receiving sensor data of a set of moving objects captured within a scan area at a POS; extracting a set of attributes from each of the set of moving objects; updating an appearance model with the set of attributes from each of the set of moving objects; and analyzing the appearance model to identify at least one of the set of moving objects as an operator of the POS.

In a second embodiment, there is a system for dynamically learning a set of attributes of an operator of a point of sale (POS). In this embodiment, the system comprises at least one processing unit, and memory operably associated with the at least one processing unit. An attribute tool is storable in memory and executable by the at least one processing unit. The attribute tool comprises: an extraction component configured to receive sensor data of a set of moving objects captured within a scan area at the POS, and extract a set of attributes from each of the set of moving objects; an identification component configured to update an appearance model with the set of attributes from each of the set of moving objects; and an analysis component configured to analyze the appearance model to identify at least one of the set of moving objects as an operator of the POS.

In a third embodiment, there is a computer-readable medium storing computer instructions, which when executed, enables a computer system to dynamically learn a set of attributes of an operator of a point of sale (POS), the computer instructions comprising: receiving sensor data of a set of moving objects captured within a scan area at a POS; extracting a set of attributes from each of the set of moving objects; updating an appearance model with the set of attributes from each of the set of moving objects; and analyzing the appearance model to identify at least one of the set of moving objects as an operator of the POS.

In a fourth embodiment, there is a method for deploying an attribute tool for use in a computer system that provides dynamic learning of a set of attributes of an operator of a point of sale (POS). In this embodiment, a computer infrastructure is provided and is operable to: receive sensor data of a set of moving objects captured within a scan area at a POS; extract a set of attributes from each of the set of moving objects; update an appearance model with the set of attributes from each of the set of moving objects; and analyze the appearance model to identify at least one of the set of moving objects as an operator of the POS.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to analyzing a set of attributes of an operator of a point of sale (POS) to dynamically learn visual attributes of the arm and/or hand of the operator of the POS. In these embodiments, an attribute tool provides this capability. Specifically, the attribute tool comprises an extraction component configured to receive sensor data of a set of moving objects captured within a scan area at a POS, and extract a set of attributes from each of the set of moving objects. The attribute tool further comprises an identification component configured to update an appearance model with the set of attributes from each of the set of moving objects. An analysis component is configured to analyze the appearance model to identify at least one of the set of moving objects as an operator of the POS.

Figure 1:
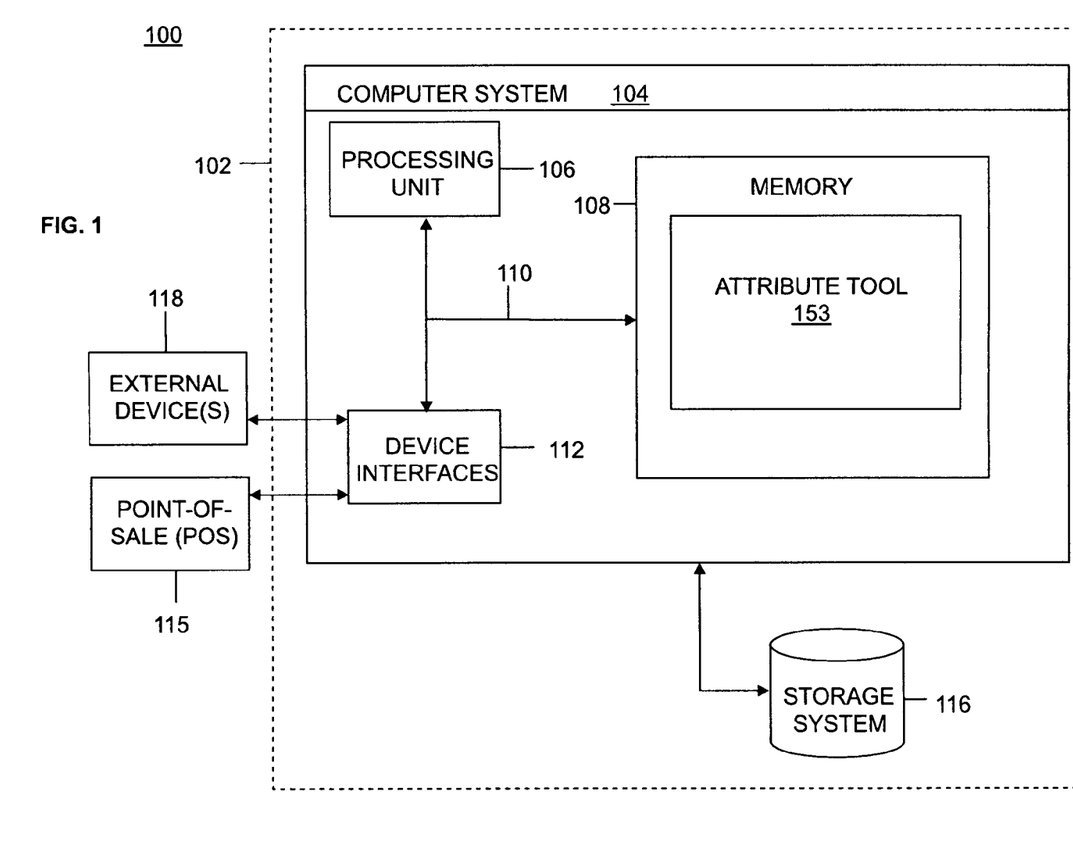
FIG. 1 shows a schematic of an exemplary computing environment in which elements of the present invention may operate.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for analyzing a set of attributes of a POS operator. It should be understood that any other computers implemented under the present invention may have different components/software, but will perform similar functions. As shown, computer system 104 includes a processing unit 106 capable of analyzing sensor data, and producing a usable output, e.g., compressed video and video meta-data. Also shown is memory 108 for storing an attribute tool 153, a bus 110, and device interfaces 112.

Figure 2:
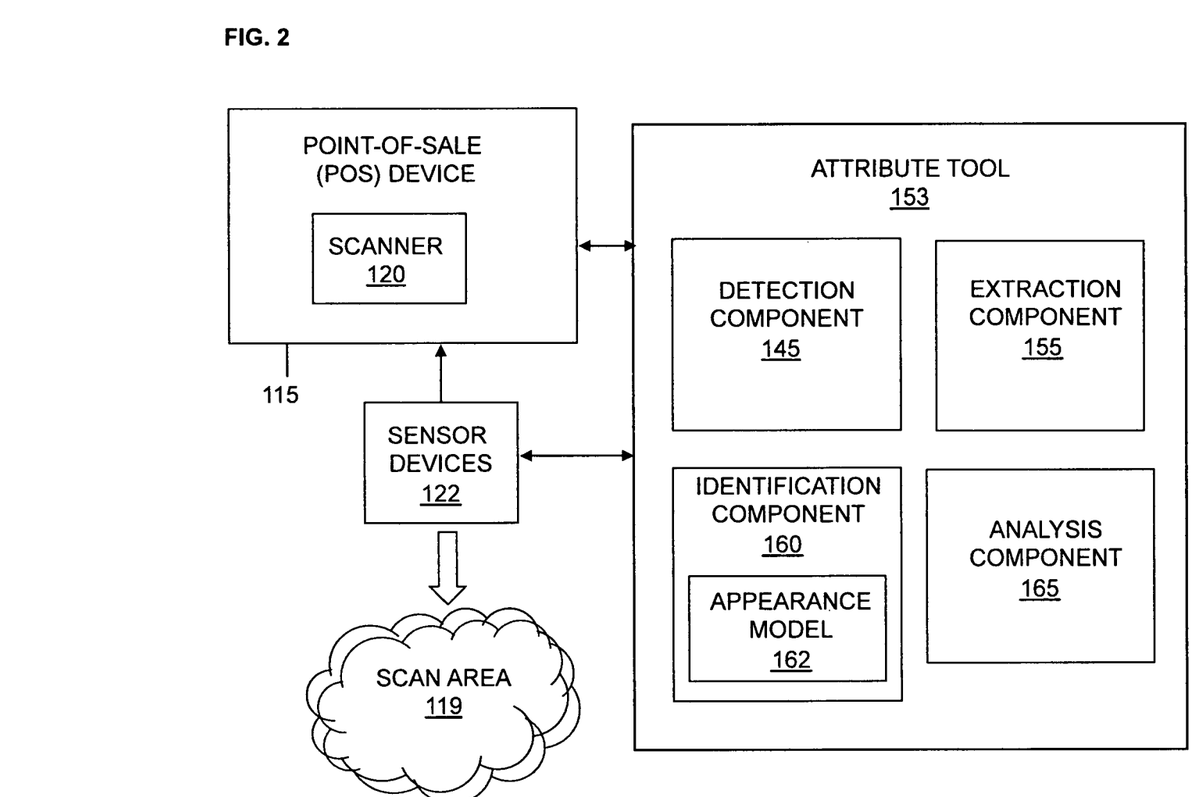
FIG. 2 shows an attribute tool that operates in the environment shown in FIG. 1.

Computer system 104 is shown communicating with a set (i.e., one or more) of sensor devices 122 and a POS 115 that communicate with bus 110 via device interfaces 112. As shown in FIG. 2, POS 115 includes a scanner 120 for reading printed barcodes that correspond to items, products, etc., within a scan area 119. Sensor devices 122 includes a set one or more of sensor devices for capturing image data representing visual attributes of moving objects (e.g., people, products, etc.) within scan area 119. Sensor device 122 can include virtually any type of sensor capable of capturing visual attributes of objects, such as, but not limited to: optical sensors, infrared detectors, thermal cameras, still cameras, analog video cameras, digital video cameras, or any other similar device that can generate sensor data of sufficient quality to support the methods of the invention as described herein.

Processing unit 106 collects and routes signals representing outputs from sensor devices 122 to attribute tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, POS 115 and sensor devices 122 are capable of two-way communication, and thus can receive signals (to power up, to sound an alert, etc.) from attribute tool 153.

In general, processing unit 106 executes computer program code, such as program code for operating attribute tool 153, which is stored in memory 108 and/or storage system 116. While executing computer program code, processing unit 106 can read and/or write data to/from memory 108 and storage system 116. Storage system 116 stores POS data and sensor data, including video metadata generated by processing unit 106, as well as rules against which the metadata is compared to identify objects and attributes of objects present within scan area 119. Storage system 116 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, but not limited to, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

Although not shown, computer system 104 could also include I/O interfaces that communicate with one or more external devices 118 that enable a user to interact with computer system 104 (e.g., a keyboard, a pointing device, a display, etc.).

Figure 3:
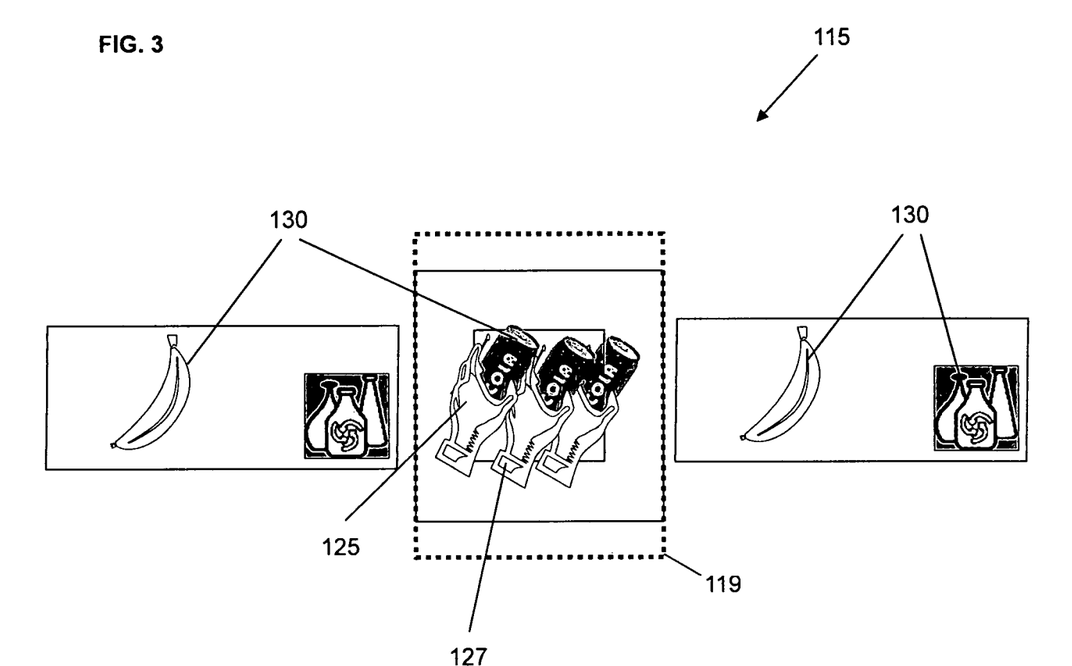
FIG. 3 shows a POS for scanning a set of objects according to embodiments of the invention.

FIGS. 2-3 show a more detailed view of attribute tool 153 according to embodiments of the invention. As shown, attribute tool 153 comprises a detection component 145 configured to detect each of a set of moving objects captured within scan area 119 at POS 115. As used herein, the set of moving objects includes, but is not limited to: a body part (e.g., arm, hand, finger, etc.) of an operator 125 of POS 115, an article of clothing 127 (e.g., a shirt or gloves) worn by operator 125 of POS 115, an item 130 to be scanned at POS 115 (e.g., merchandise, a receipt, a membership card), or any other type of object typically presented to a scan area at a POS. Detection component 145 processes sensor data from sensor devices 122 in real-time, identifying attributes of objects that are detected in scan area 119. In one embodiment, in which video sensor data is received from a digital video camera, identification component 155 uploads messages in extensible mark-up language (XML) to a data repository, such as storage system 116 (FIG. 1). Detection component 145 provides the software framework for hosting a wide range of video analytics to accomplish this. The video analytics are intended to detect and track a person and/or a plurality of objects moving across a video image and perform an analysis of all characteristics associated with each object in scan area 119. The set of moving objects can be detected using a number of approaches, including but not limited to: background modeling, object detection and tracking, spatial intensity field gradient analysis, diamond search block-based (DSBB) gradient descent motion estimation, or any other method for detecting and identifying objects captured by a sensor device.

Next, an extraction component 155 is configured to receive sensor data of the set of moving objects captured within scan area 119 at POS 115, and extract a set of attributes from each of the set of moving objects captured within scan area 119 at POS 115. An identification component 160 is configured to update an appearance model 162 with the set of attributes extracted from each of the set of moving objects. In an exemplary embodiment, attribute tool 153 relates each of the attributes to appearance model 162 according to various attributes including, but not limited to, appearance, color, texture, gradients, edge detection, motion characteristics, shape, spatial location, etc. An identification component 160 provides the algorithm(s) necessary to take the data associated with each of the extracted attributes and dynamically map it into groups/models by frequency, along with additional metadata that captures a more detailed description of the extracted attribute and/or object. For example, appearance model 162 comprises visual attribute distributions (e.g., color distributions) and video object distributions (e.g., motion, spatial location, gradient, etc.) for each of the set of objects represented within appearance model 162. In a preferred embodiment, one of the visual attribute distributions represents a skin and/or attire color of operator 125 of POS 115, as will be further described below.

Appearance model 162 is continuously updated and cross-referenced against attributes from previously received sensor data to dynamically learn the attributes (e.g., skin color) of operator 125 of POS 115. To accomplish this, attribute tool 153 comprises an analysis component 165 configured to analyze the updated appearance model 162 to identify at least one of the set of moving objects captured within scan area 119 as operator 125 of POS 115. Specifically, analysis component 165 is configured to analyze the attribute distribution of each of the set of objects, and determine a prominent color model in the attribute distribution. As the arms/hands of operator 125 are more consistently observed in scan area 119, they provide strong and prominent models in the color and video object distributions. By detecting the largest and most prominent color model in the attribute distribution, the color model of operator 125 can be reliable identified.

Figure 4:
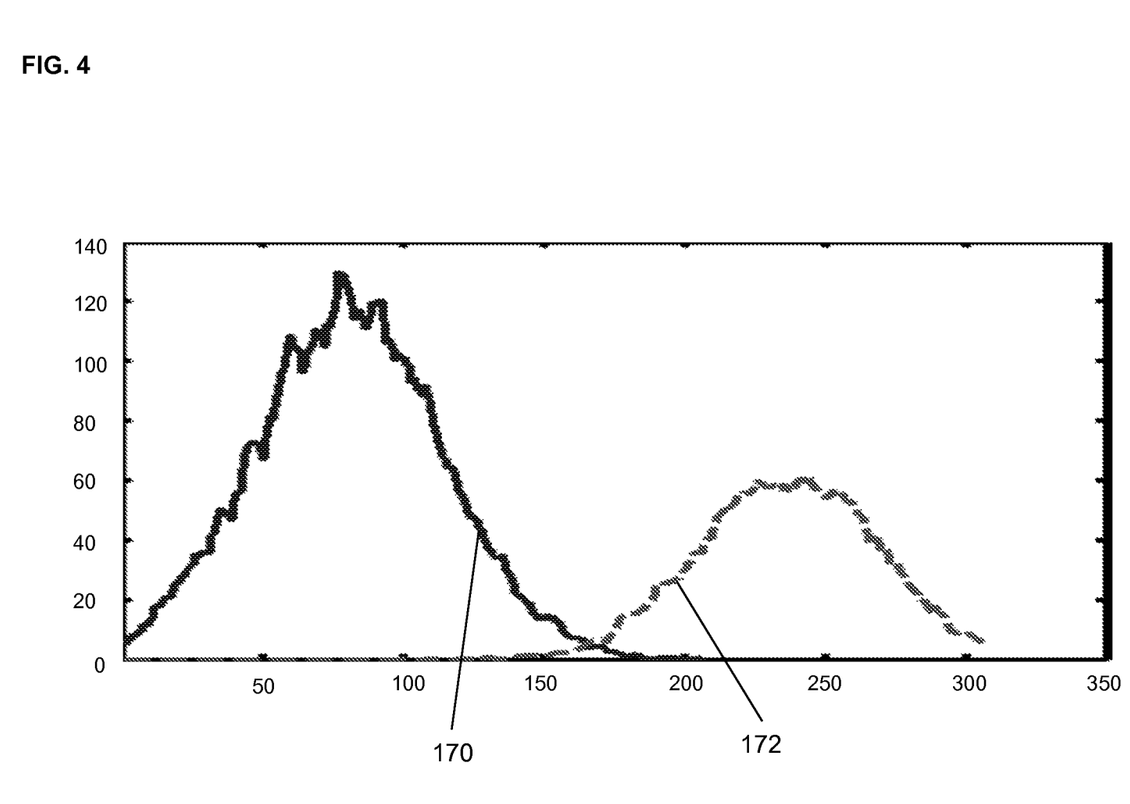
FIG. 4 shows a graphical representation of an attribute distribution for a set of objects at the POS.

For example, consider an exemplary attribute distribution for a set of objects at a POS, as shown in FIG. 4. The dominant group 170 (i.e., prominent frequency) in the attribute distribution corresponds to a skin color or attire color of a moving body part of the POS operator. The less dominant group 172 corresponds to miscellaneous objects, such as products, receipts, membership cards, etc. During operation, when new color attribute information is obtained from objects moving within the scan area, it is matched against all previously existing models within appearance model 162, and updated with the groups having similar frequencies (i.e., the least distance between models). As such, based on skin and/or attire color, operators of the POS can be identified and analyzed for increased loss prevention.

It can be appreciated that the methodologies disclosed herein can be used within a computer system to dynamically learn a set of attributes of an operator of a POS, as shown in FIG. 1. In this case, attribute tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 5:
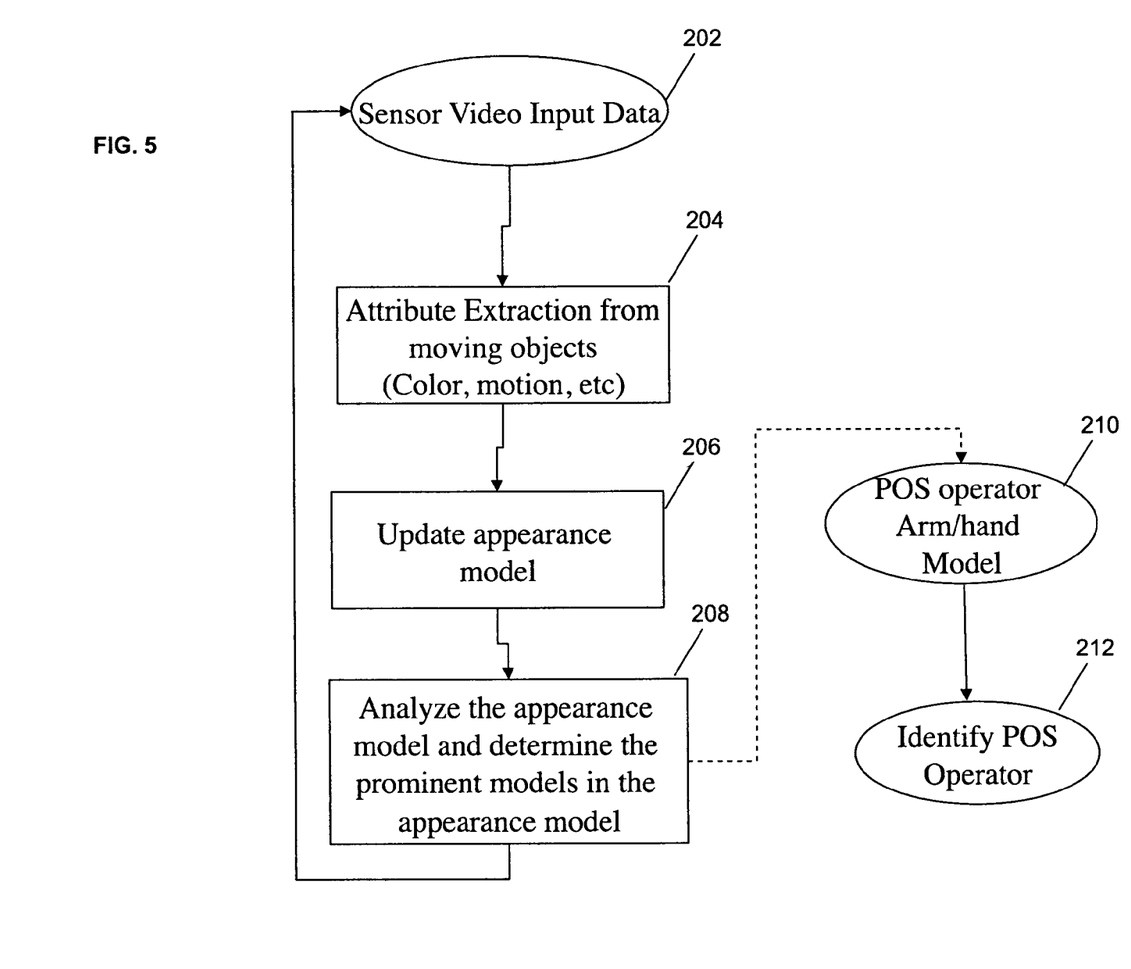
FIG. 5 shows a process flow for dynamically learning a set of attributes of an Operator of a point of sale (POS).

The program modules carry out the methodologies disclosed herein, as shown in FIG. 5. According to one embodiment, at 202, sensor video input data corresponding to a set of moving objects captured within a scan area at a POS is received. At 204, attributes (e.g., visual color attributes) are extracted from each of the moving objects. At 206, an appearance model is updated with the extracted set of attributes from each of the moving objects. At 208, the appearance model is analyzed to determine prominent models (e.g., color, motion, etc.) in the appearance model. At 210, it is determined that the prominent models represent a model of a POS operator's arm/hand, etc. At 212, based on this determination, at least one of the set of moving objects within the scan area at the POS is identified as the operator of the POS.

The flowchart of FIG. 5 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for dynamically learning a set of attributes of a POS operator. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for dynamically learning a set of attributes of an operator of a point of sale (POS) comprising:
   receiving sensor data over a series of successive scans of a set of moving objects captured within a scan area at a POS;
   extracting a set of attributes from each of the set of moving objects;
   updating an appearance model with the set of attributes from each of the set of moving objects, wherein the appearance model comprises a visual attribute distribution and a video object distribution for each extracted attribute from each of the set of moving objects captured over the series of success scans, and wherein the appearance model further comprises a plurality of groupings of visual attribute distributions and a plurality of groupings of video object distributions identified based on a relative similarity among each of the visual attribute distributions and each of the video object distributions for each extracted attribute from each of the set of moving objects captured over the series of success scans; and
   analyzing the appearance model to identify a grouping from the plurality of groupings having a highest number of similar visual attribute distributions as an operator of the POS.

2. The method according to claim 1 further comprising detecting each of the set of moving objects within the scan area at the POS.

3. The method according to claim 1, the analyzing comprising:
   analyzing the visual attribute distribution of each of the set of moving objects; and
   determining a prominent color model in the visual attribute distribution of each of the set of moving objects.

4. The method according to claim 1, the set of objects comprising at least one of the following: a body part of the operator of the POS, an article of clothing worn by the operator of the POS, or an item to be scanned at the POS device.

5. A system for dynamically learning a set of attributes of an operator of a point of sale (POS) comprising:
   at least one processing unit;
   memory operably associated with the at least one processing unit; and
   an attribute tool storable in memory and executable by the at least one processing unit, the attribute tool comprising:
      an extraction component configured to:
         receive sensor data over a series of successive scans of a set of moving objects captured within a scan area at a POS; and
         extract a set of attributes from each of the set of moving objects;
      an identification component configured to update an appearance model with the set of attributes from each of the set of moving objects, wherein the appearance model comprises a visual attribute distribution and a video object distribution for each extracted attribute from each of the set of moving objects captured over the series of success scans, and wherein the appearance model further comprises a plurality of groupings of visual attribute distributions and a plurality of groupings of video object distributions identified based on a relative similarity among each of the visual attribute distributions and each of the video object distributions for each extracted attribute from each of the set of moving objects captured over the series of success scans; and
      an analysis component configured to analyze the appearance model to identify a grouping from the plurality of groupings having a highest number of similar visual attribute distributions as an operator of the POS.

6. The attribute tool according to claim 5 further comprising a detection component configured to detect each of the set of moving objects within the scan area at the POS.

7. The attribute tool according to claim 5, the analysis component further configured to:
   analyze the visual attribute distribution of each of the set of moving objects; and
   determine a prominent color model in the visual attribute distribution of each of the set of moving objects.

8. The attribute tool according to claim 5, the set of moving objects comprising at least one of the following: a body part of the operator of the POS, an article of clothing worn by the operator of the POS, or an item to be scanned at the POS device.

9. A computer-readable storage medium storing computer instructions, which when executed, enables a computer system to dynamically learn a set of attributes of an operator of a point of sale (POS), the computer instructions comprising:
   receiving sensor data over a series of successive scans of a set of moving objects captured within a scan area at a POS;
   extracting a set of attributes from each of the set of moving objects;
   updating an appearance model with the set of attributes from each of the set of moving objects, wherein the appearance model comprises a visual attribute distribution and a video object distribution for each extracted attribute from each of the set of moving objects captured over the series of success scans, and wherein the appearance model further comprises a plurality of groupings of visual attribute distributions and a plurality of groupings of video object distributions identified based on a relative similarity among each of the visual attribute distributions and each of the video object distributions for each extracted attribute from each of the set of moving objects captured over the series of success scans; and
   analyzing the appearance model to identify a grouping from the plurality of groupings having a highest number of similar visual attribute distributions as an operator of the POS.

10. The computer-readable storage medium according to claim 9 further comprising computer instructions for detecting each of the set of moving objects within the scan area at the POS.

11. The computer-readable storage medium according to claim 8, the computer instructions for analyzing the appearance model further comprising computer instructions for:
    analyzing the attribute distribution of each of the set of moving objects; and
    determining a prominent color model in the attribute distribution of each of the set of moving objects.

12. The computer-readable storage medium according to claim 9, the set of objects comprising at least one of the following: a body part of the operator of the POS, an article of clothing worn by the operator of the POS, or an item to be scanned at the POS device.

13. A method for deploying an attribute tool for use in a computer system that dynamically learns a set of attributes of an operator of a point of sale (POS), the method causing the attribute tool to perform the computer implemented steps to:
    receive sensor data over a series of successive scans of a set of moving objects captured within a scan area at a POS;

extract a set of attributes from each of the set of moving objects;

update an appearance model with the set of attributes from each of the set of moving objects, wherein the appearance model comprises a visual attribute distribution and a video object distribution for each extracted attribute from each of the set of moving objects captured over the series of success scans, and wherein the appearance model further comprises a plurality of groupings of visual attribute distributions and a plurality of groupings of video object distributions identified based on a relative similarity among each of the visual attribute distributions and each of the video object distributions for each extracted attribute from each of the set of moving objects captured over the series of success scans; and analyze the appearance model to identify a grouping from the plurality of groupings having a highest number of similar visual attribute distributions as an operator of the POS.

14. The method according to claim 13, further comprising the computer implemented step to detect each of the set of moving objects within the scan area at the POS.

15. The method of claim 13, further comprising the computer implemented step to:

analyze the attribute distribution of each of the set of moving objects; and determine a prominent color model in the visual attribute distribution of each of the set of moving objects.

16. The method according to claim 13, the set of objects comprising at least one of the following: a body part of the operator of the POS, an article of clothing worn by the operator of the POS, or an item to be scanned at the POS device.

* * * * *